US012383104B2

(12) United States Patent
Kling et al.

(10) Patent No.: US 12,383,104 B2
(45) Date of Patent: Aug. 12, 2025

(54) DISPENSER WITH ELECTRONIC LOCK

(71) Applicant: Essity Hygiene and Health Aktiebolag, Gothenburg (SE)

(72) Inventors: Robert Kling, Gothenburg (SE); Antonio Källgren, Borlänge (SE); Mark W. Henson, Harrodsburg, KY (US)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 237 days.

(21) Appl. No.: 17/928,359

(22) PCT Filed: Jun. 22, 2020

(86) PCT No.: PCT/SE2020/050644
§ 371 (c)(1),
(2) Date: Nov. 29, 2022

(87) PCT Pub. No.: WO2021/262048
PCT Pub. Date: Dec. 30, 2021

(65) Prior Publication Data

US 2023/0200597 A1 Jun. 29, 2023

(51) Int. Cl.

| | |
|---|---|
| ***E05B 47/00*** | (2006.01) |
| ***A47K 10/32*** | (2006.01) |
| ***E05B 47/06*** | (2006.01) |

(52) U.S. Cl.
CPC .......... *A47K 10/32* (2013.01); *E05B 47/0001* (2013.01); *E05B 47/0607* (2013.01);
(Continued)

(58) Field of Classification Search
CPC .. E05B 47/06; E05B 47/0607; E05B 47/0657; E05B 47/0665; E05B 47/0669;
(Continued)

(56) References Cited

U.S. PATENT DOCUMENTS 6,964,184 B1 * 11/2005 Gregory ................ E05B 1/0038 70/DIG. 56
7,409,842 B2 * 8/2008 Kuo ...................... E05B 13/105 70/58

(Continued)

FOREIGN PATENT DOCUMENTS

DE 202016102225 U1 * 8/2016 ......... E05B 47/0603
GB 2429032 A 2/2007

OTHER PUBLICATIONS

International Search Report & Written Opinion for International Application No. PCT/SE2020/050644; International Filing Date: Jun. 22, 2020; Date of Mailing: Feb. 17, 2021; 14 pages.
European Application No. 20942419.1-1005; Extended European Search Report dated Mar. 5, 2024; 9 pages.
Chinese Application No. 202080100912.X; Office Action with English translation dated Nov. 30, 2024; 22 pages.
Chinese Application No. 202080100912.X; Office Action with English translation dated Apr. 30, 2025; 17 pages.

*Primary Examiner* — Kristina R Fulton
*Assistant Examiner* — Noah Horowitz
(74) *Attorney, Agent, or Firm* — CANTOR COLBURN LLP

(57) ABSTRACT

A dispenser lock assembly, including a mechanical lock assembly for locking an openable part to a fixed part and an electronic lock assembly, the mechanical lock assembly including a movably mounted part allowing operation of the mechanical lock assembly and a latch connected to the operation part such that upon operation of the operation part the latch is moved from a locked to an unlocked position, the electronic lock assembly including a blocking member movable between a blocking and an unblocking position, an electric actuator for moving the blocking member between blocking and unblocking positions, a receiver for receiving an unlock signal, a control unit that compares the unlock signal to at least one prestored value and upon determining that the unlock signal matches one of the at least one prestored values controlling the electric actuator to move the
(Continued)

blocking member from the blocking to the unblocking position.

31 Claims, 6 Drawing Sheets

(52) U.S. Cl.
CPC ................. *A47K 2010/3246* (2013.01); *E05B 2047/0094* (2013.01)

(58) Field of Classification Search
CPC ............. E05B 47/0603; E05B 47/0611; E05B 47/0619; E05B 47/0626; E05B 47/0634; E05B 2047/0094; E05B 2047/0095; E05B 63/0052; E05B 1/0038; E05B 2009/047; E05B 15/0053; E05B 15/10; A47K 10/32; A47K 2010/3246
See application file for complete search history.

(56) References Cited

U.S. PATENT DOCUMENTS

| | | | | |
|---|---|---|---|---|
| 7,647,797 | B1 * | 1/2010 | Viso Cabrera | E05B 1/0038 292/144 |
| 9,279,273 | B2 * | 3/2016 | Eriksson | E05C 3/30 |
| 10,443,269 | B2 * | 10/2019 | Piirainen | H02K 49/104 |
| 11,454,056 | B2 * | 9/2022 | Paré | A47K 10/32 |
| 12,134,922 | B2 * | 11/2024 | Garneau | E05B 47/0012 |
| 2006/0112747 | A1 | 6/2006 | Moon et al. | |
| 2006/0185407 | A1 | 8/2006 | Priest et al. | |
| 2010/0000273 | A1 | 1/2010 | Viso Cabrera et al. | |
| 2011/0120200 | A1 | 5/2011 | Eriksson et al. | |
| 2018/0073275 | A1 | 3/2018 | Ullrich et al. | |
| 2019/0031262 | A1 | 1/2019 | Prellwitz | |
| 2019/0093391 | A1 * | 3/2019 | Ek | H04N 7/183 |

* cited by examiner

DISPENSER WITH ELECTRONIC LOCK

CROSS REFERENCE TO RELATED APPLICATIONS

This application is a National Stage application of PCT/SE2020/050644, filed Jun. 22, 2020, which is incorporated by reference in its entirety herein.

FIELD

The present disclosure relates to a dispenser having a dispenser housing for holding a dispensable product and an electronic lock assembly for locking and unlocking the dispenser housing.

BACKGROUND

Dispensers for some consumable products, such as paper towel products, liquid soap, and the like, may require access to the interior of the dispenser in order to be able to remove or refill the product periodically. Depending on where the dispenser is located, such as in a public area, it may be further required that the dispenser be locked to prevent unauthorized persons from having access to remove the entire contents of the dispenser. Known dispensers have mechanical locks which are operable by means of a key for unlocking and opening the dispenser housing.

SUMMARY

It would be desirable to provide a dispenser with an electronic lock, more so if that lock is of simple construction, is robust, and/or requires low power consumption.

These and other aims may be achieved with the subject-matter of the independent claims.

The disclosure provides, in one aspect, a dispenser housing having an interior volume for holding a dispensable product, the dispenser housing having a fixed part and an openable part which is movable or removable with respect to the fixed part to provide access to the interior volume for refilling the dispensable product. The dispenser comprises a mechanical lock assembly provided for locking the openable part to the fixed part of the dispenser housing and an electronic lock assembly provided for blocking operation of the mechanical lock assembly. The mechanical lock assembly may comprise a user accessible, movably mounted operation part for allowing a user to operate the mechanical lock assembly and a latch connected to the operation part such that upon operation of the operation part by the user the latch is moved from a locked position to an unlocked position. The electronic lock assembly may comprise a blocking member movable between a blocking position in which it blocks the operation of the mechanical lock assembly and an unblocking position in which it allows the operation of the mechanical lock assembly, an electric actuator arranged for moving the blocking member between the blocking and unblocking positions, a receiver for receiving an unlock signal, and a control unit, configured for comparing the received unlock signal to a prestored value and upon determining that the unlock signal matches the prestored value controlling the electric actuator to move the blocking member from the blocking position to the unblocking position.

As used herein, the term "unlock signal" is intended to encompass any signal which contains an instruction or code which is interpreted by the control unit as an authorisation or instruction to unlock the dispenser housing (by operating the electric actuator). Examples are a signal containing an instruction for the control unit to operate the electric actuator and unblock the mechanical lock assembly, a code or ID obtained from an electronic key such as an RFID key held in the vicinity of the receiver, and the like.

An advantage of the dispenser described above is that the access to the dispenser may be integrated with other electronic access control systems that are commonly used in many buildings nowadays. For example, the same electronic key or badge may be used as electronic key for access to the dispenser as the one that is used for access to the building itself. This obviates the need to provide and manage sets of mechanical keys.

In embodiments according to the disclosure, the electronic lock assembly may be mounted on the fixed part of the dispenser housing. Possibly also the mechanical lock assembly may be mounted on the fixed part of the dispenser housing. An advantage of such embodiments is that they avoid adding weight to the openable part of the dispenser housing i.e., they avoid adding the weight of at least the electronic lock assembly to the openable part of the dispenser housing. Another advantage of such embodiments is that they may avoid moving the electronic lock assembly upon opening and closing the openable part of the dispenser housing, which in turn minimizes wear or damage to the electronic lock assembly, thus making it more robust and/or reliable in operation.

In particular embodiments, the mechanical lock assembly may comprise a resilient member biasing the latch towards the locked position. Also, in particular embodiments, the latch may be shaped for engaging, in the locked position, behind a counterpart on the dispenser housing and for being pushed away by the counterpart against the bias of the resilient member when the openable part of the dispenser housing is pushed closed. In this way, the openable part of the dispenser housing may be pushed closed by the user without having to operate the mechanical lock assembly.

In certain embodiments, the user accessible operation part of the mechanical lock assembly may comprise, or be formed by, a push button. The latch may be directly connected to the push button. Specifically, in certain embodiments, the latch may be connected to the push button via a motion transferring mechanism. For example, such motion transferring mechanism may be configured for converting an axial movement of the push button into a rotational movement of the latch. In embodiments according to the disclosure, the blocking member may be arranged for blocking movement of the latch. These and other features may contribute in achieving a mechanical lock assembly and/or an electronic lock assembly of simple construction.

In specific embodiments, the receiver may be adapted for receiving wireless communication signals, such as short-range wireless communication signals e.g., Bluetooth®, Bluetooth® Low Energy, infrared, radio frequency communication, near field communication (NFC), ultra-wideband and Zigbee®. From a perspective of achieving low power operation, the chosen communication standards to used in the dispenser may be Bluetooth® Low Energy and/or radio frequency communication.

The receiver may form part of an electronic key reader, such as an RFID reader, an NFC key reader, an optic key reader (barcode, QR-code and the like), for example, or some other type of reader. In other embodiments, the receiver may be configured for receiving the unlock signal via one of the above mentioned short-range wireless communication standards.

In particular embodiments, the control unit may be configured for controlling the electric actuator to move the blocking member from the unblocking position to the blocking position upon detecting receipt of a lock signal via the receiver. The lock signal is a signal with an instruction or code to lock the electronic key assembly.

The control unit may be configured for controlling the electric actuator to move the blocking member from the unblocking position to the blocking position for a predetermined length of time, for example a time period between 1 and 5 minutes, after the blocking member has been moved from the blocking position to the unblocking position. In this way, it may be unnecessary to provide a lock signal to the electronic key assembly, i.e. a signal with an instruction or code to lock the electronic key assembly. This may contribute in achieving a low power operation of the dispenser, as the control unit does not need to monitor receipt of the lock signal. Further, this may ensure that the dispenser is electronically locked, for example if the lock signal would not be received for some reason.

The disclosure provides, in another aspect, a system comprising at least one dispenser as described herein, and a remote unit configured for transmitting the unlock signal to said at least one dispenser. In this way it may be avoided to provide a key reader or the like in every dispenser. In a certain room or area, one remote unit may be provided which controls access to a number of dispensers within that room or area. The remote unit may in and of itself be integrated in a dispenser.

In embodiments according to the disclosure, the remote unit may comprise an electronic key reader and be configured for transmitting the unlock signal to the at least one dispenser upon detecting an authorized electronic key, i.e. an electronic key which matches an authorization to access the at least one dispenser.

In embodiments according to the disclosure, the remote unit may be further configured for transmitting a lock signal to said at least one dispenser. The remote unit is configured for transmitting said lock signal upon detecting said authorized electronic key a second time or upon detecting removal of said authorized electronic key from the remote unit. Alternatively, or in combination, the remote unit may be configured for transmitting that lock signal for a predetermined length of time, for example a time period between 5 and 10 minutes, after transmission of the unlock signal.

The disclosure provides, in yet another aspect, a lock assembly on its own which is suitable for use with a dispenser comprising the mechanical lock assembly and the electronic lock assembly as disclosed in detail above.

BRIEF DESCRIPTION OF THE DRAWINGS

The present disclosure will be discussed in more detail below, with reference to the attached drawings.

DESCRIPTION OF EMBODIMENTS

Figure 1:
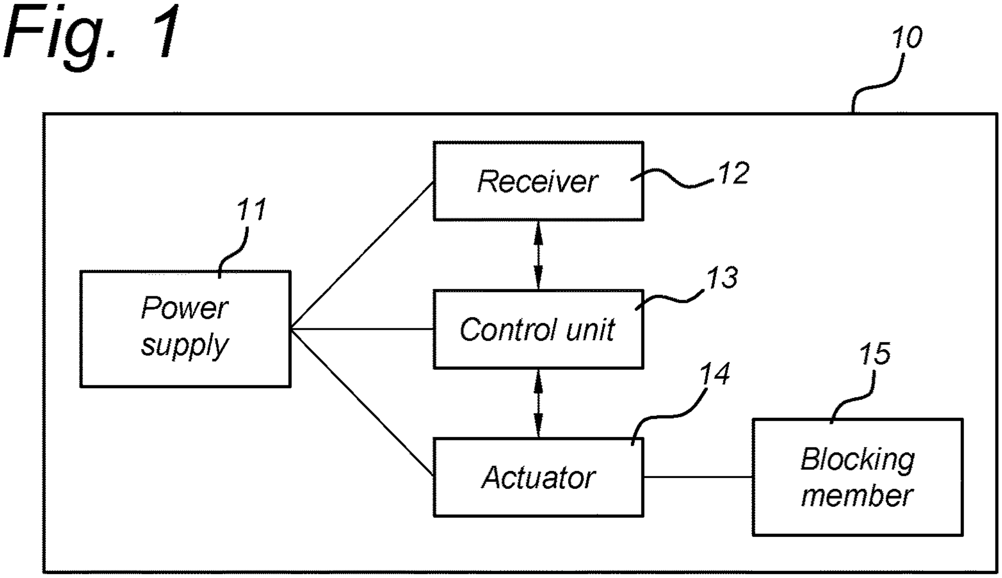
FIG. 1 shows a schematic view of an electronic lock assembly according to the present disclosure.

The present disclosure will refer to particular embodiments with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure may operate in sequences other than those described or illustrated herein.

Moreover, the terms top, bottom, over, under and the like in the description and the claims are used for descriptive purposes and not necessarily for describing relative positions. The terms so used are interchangeable under appropriate circumstances and the embodiments described herein may operate in orientations other than those described or illustrated herein.

Furthermore, the various embodiments, although referred to as "preferred" are to be construed as mere examples of how the disclosure may be implemented rather than as limiting the scope of the disclosure.

Different aspects of the present disclosure will be described more fully hereinafter with reference to the enclosed drawings. The embodiments disclosed herein may, however, be realized in many different forms and should not be construed as being limited to the aspects set forth herein.

A first embodiment of a dispenser is described with reference to FIGS. 1-3. FIG. 2 shows a dispenser 1 comprising a dispenser housing 50 having an interior volume for holding a dispensable product, the dispenser housing 50 having a fixed part 2 and an openable part 3 which is in this embodiment hinged to the fixed part 2. FIG. 2 shows the openable part 3 in an open position, providing access to the interior volume for refilling the dispensable product. The dispenser comprises a mechanical lock assembly 20 provided for locking the openable part 3 to the fixed part 2 of the dispenser housing 50 and an electronic lock assembly 10 provided for blocking operation of the mechanical lock assembly 20. The mechanical lock assembly 20 (see FIG. 3) comprises a user accessible, movably mounted operation part, in this embodiment a push button 22, for allowing a user to operate the mechanical lock assembly and a latch 23 connected to the operation part. Upon operation of the push button 22 by the user, the latch 23 is moved from a locked position to an unlocked position (if not blocked by the electronic lock assembly). The electronic lock assembly 10, see FIGS. 1 and 3, comprises a blocking member 15 movable between a blocking position (FIG. 3A) in which it blocks the operation of the mechanical lock assembly, in particular blocks movement of the latch 23, and an unblocking position (FIG. 3B-3C) in which it allows operation of the mechanical lock assembly 20, in particular the blocking member 15 is moved out of the way of the latch 23. The electronic lock assembly 10 comprises an electric actuator 14, for example an electric motor with a transmission, which is arranged for moving the blocking member 15 between the blocking and unblocking positions, a receiver 12 for receiving an unlock signal, and a control unit 13, configured for comparing the received unlock signal to a prestored value and upon determining that the unlock signal matches the prestored value controlling the electric actuator 14 to move the blocking member 15 from the blocking position to the unblocking position. The electronic lock assembly 10 further comprises a power supply 11, for example comprising one or more batteries, which provides electric power to the receiver 12, control unit 13 and electric actuator 14.

In any embodiment described herein, the electric actuator 14 may generally comprise any electric drive component that turns the control signal that it receives from the control unit 13 into movement of the blocking member 15. Examples of possible actuators include: an electric motor, a solenoid, a stepper motor. Possibly, the electric actuator 14 may comprise a transmission to transfer the motion of the electric drive component to the blocking member 15.

In any embodiment described herein, the receiver 12 may be configured for receiving wireless communication signals, such as for example short-range wireless communication uses signals that travel from a few centimeters to several meters. Examples of suitable short-range wireless communication standards are Bluetooth®, Bluetooth® Low Energy, infrared, radio frequency communication, near field communication, ultra-wideband and Zigbee®.

Figure 2A:
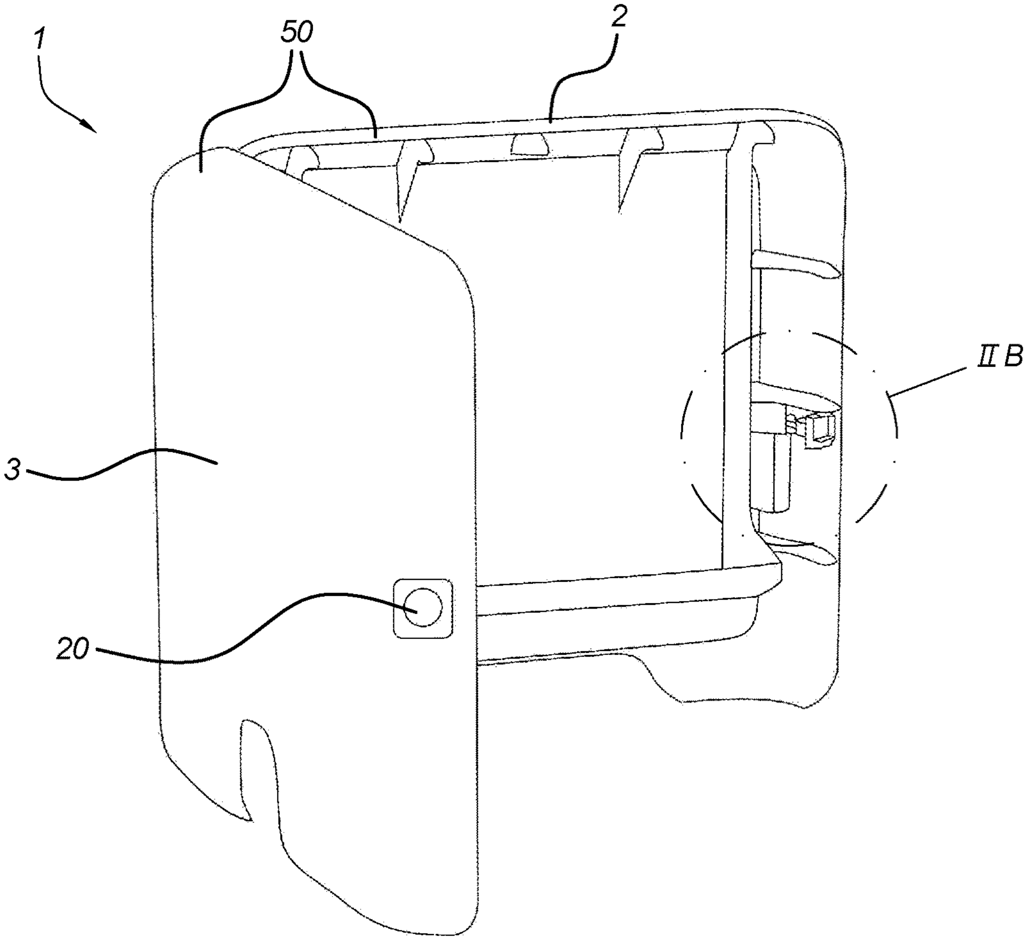
FIG. 2A-B shows an embodiment of a dispenser according to the present disclosure.
Figure 2B:
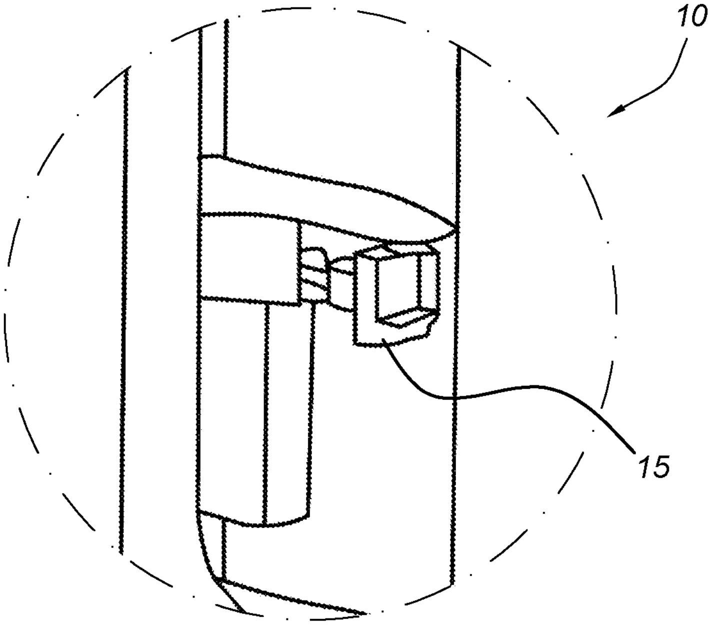

The operation of the embodiment of FIGS. 1-3 is as follows. The receiver 12 receives an unlock signal, i.e. a signal containing an instruction or code for the control unit 13 to unlock the dispenser. The unlock signal may be received from a remote unit, as described elsewhere herein, or obtained by scanning or reading an electronic key which is held in the vicinity of the dispenser. The receiver 12 passes the received signal to the control unit 13, which compares it to a prestored value representative of the "unlock" instruction or one or more prestored values representative of authorised person(s), for example the ID code(s) of person(s) who are allowed access to the dispenser. Upon determining that there is a match, i.e. that the dispenser may be unlocked, the control unit 13 operates the electric actuator 14 to move the blocking member 15 from the blocking position to the unblocking position.

Figure 3A:
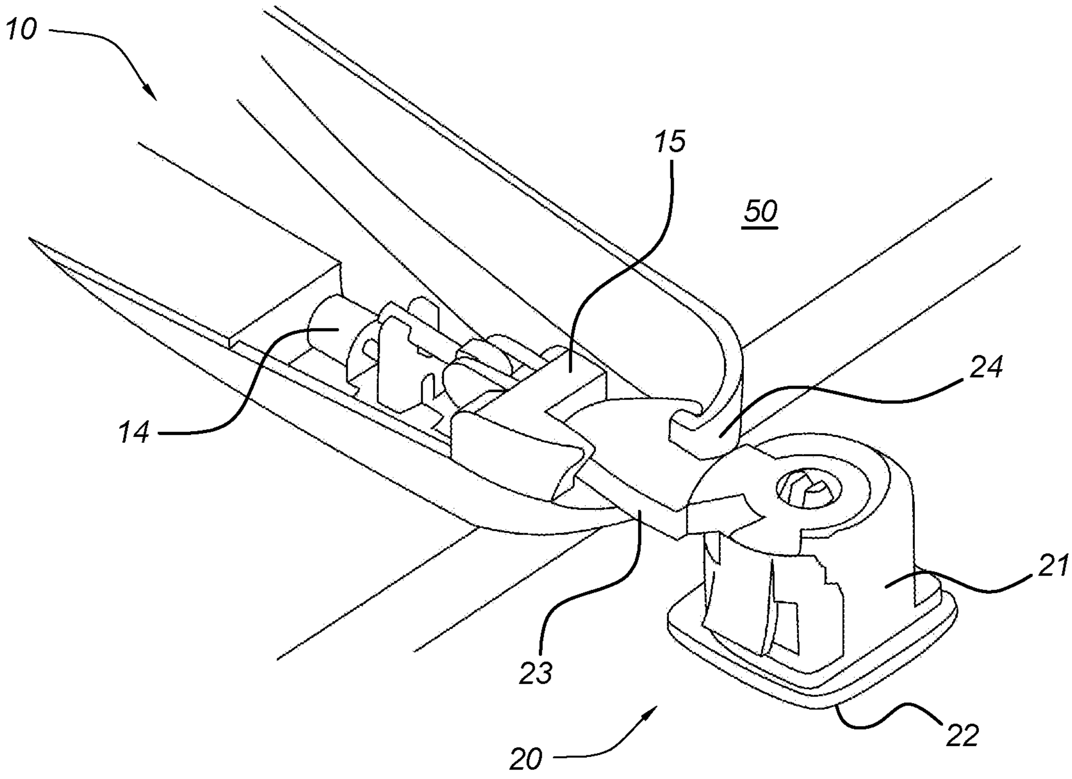
FIG. 3A-C shows an embodiment of a dispenser according to the present disclosure as well as the operation of its electronic lock assembly.

FIG. 3A shows the blocking member 15 in the blocking position. It blocks the movement of the latch 23, which is in locked position and engages a counterpart 24 on the dispenser housing 50 and thereby prevents the dispenser housing 50 from being opened.

Figure 3B:
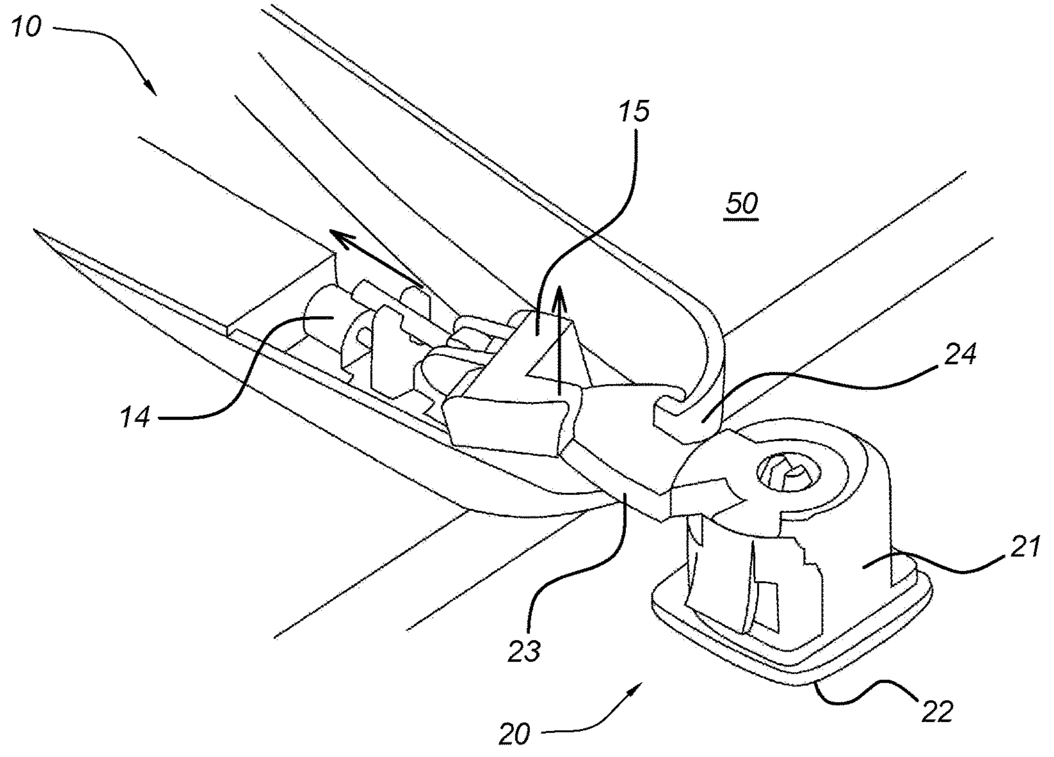

FIG. 3B shows the blocking member 15 being moved to the unblocking position. In the embodiment shown, as indicated by the arrows, the electric actuator 14 pulls the top side of the blocking member 15 backwards so that the blocking member 15 is tilted and moved out of the way of the latch 23.

Figure 3C:
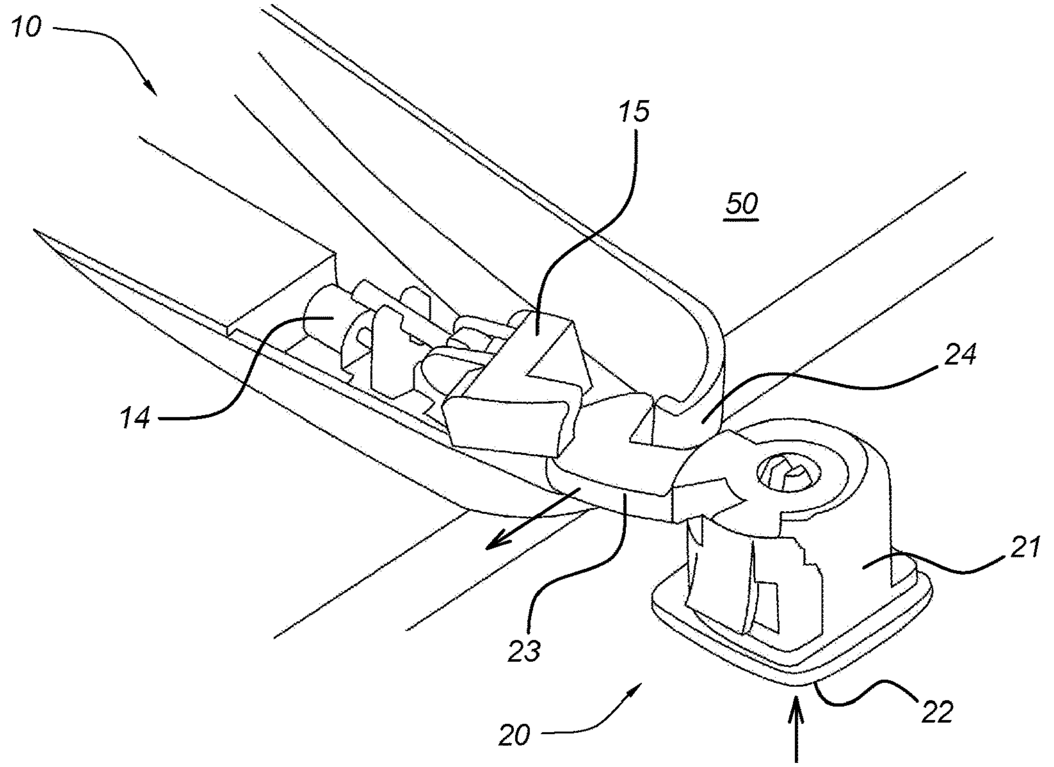

FIG. 3C shows the operation of the mechanical lock assembly 20 which is now possible because the clocking member 15 has been moved out of the way. The movement is indicated by the arrows. To open the dispenser housing 50, a user pushes down the push button 22, which is movably mounted in the housing 21 of the mechanical lock assembly 20. An internal mechanism of the mechanical lock assembly 20 converts the axial movement of the push button 22 into a rotational movement of the latch 23. Such an internal mechanism is known per se and therefore needs no further explanation herein (see for example the push button operated mode of the lock described in US 2011/0120200). By operating the push button 22, the latch 23 is pushed against a bias which is provided by a resilient member (not shown). In this way, the latch 23 is moved away from the counterpart 24 on the dispenser housing 50, so that the dispenser housing 50 may be opened. Upon release of the push button 22, the resilient member pushes the latch 23 back to the locked position.

In the embodiment shown in FIGS. 3A-C, the latch 23 is shaped for engaging the counterpart 24 and is also shaped for being pushed away by the counterpart 24 against the bias of the resilient member. This means that the user does not have to operate the push button 22 again upon closing the dispenser housing 50; the counterpart 24 will push the latch 23 away when the user pushes the openable part 3 onto the fixed part 2 of the dispenser housing 50 and as soon as the hooked part of the latch 23 is past the edge of the counterpart 24, the latch springs back to the locked position as a result of the resilient member pushing the latch back. Then, the latch 23 engages the counterpart 24 and the dispenser housing 50 is closed.

Next, the control unit 13 may operate the electric actuator 14 to move the blocking member 15 from the unblocking position to the blocking position and lock the dispenser housing 50. The control unit 13 may perform this operation upon receipt of a lock signal via the receiver 12, i.e. an instruction or code to lock the dispenser housing 50 as described elsewhere herein, or upon lapse of a predetermined length of time of for example a few minutes, for example a time period between 1 and 5 minutes. Such a time period may be chosen depending on an estimated time needed for refilling the dispenser 1 with the dispensable product.

In the embodiment shown in FIGS. 2 and 3, the electronic lock assembly 10 is mounted on the fixed part 2 of the dispenser housing 50 and the mechanical lock assembly 20 is mounted on the openable part 3 of the dispenser housing 50. This has the advantage that the weight of the openable part 3 is kept low and that the electronic lock assembly 10 is not moved during operation. Furthermore, the electronic lock assembly 10 may be less subjected to movement or vibrations which may for example occur upon closing the openable part 3 of the dispenser housing 50. As a result, a robust electronic lock assembly 10 may be achieved with a reliable operation and a long useful life.

FIGS. 4 and 5 show other embodiments of lock assemblies which may be used in dispensers according to the disclosure, as well as their operation.

Figure 4A:
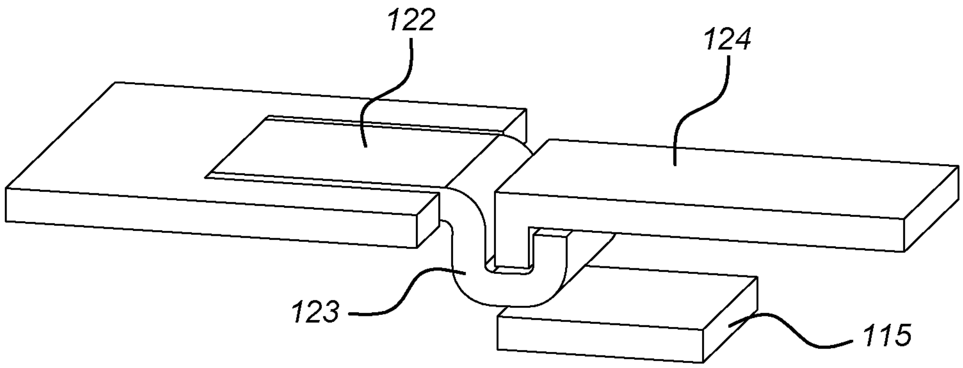
FIG. 4A-C shows a schematic view of an embodiment of a mechanical lock assembly for use in dispensers according to the present disclosure, as well as its operation.
Figure 4B:
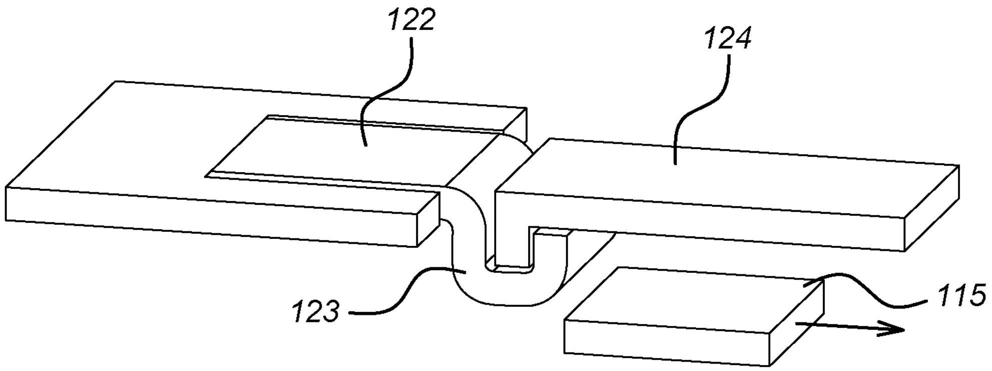
Figure 4C:
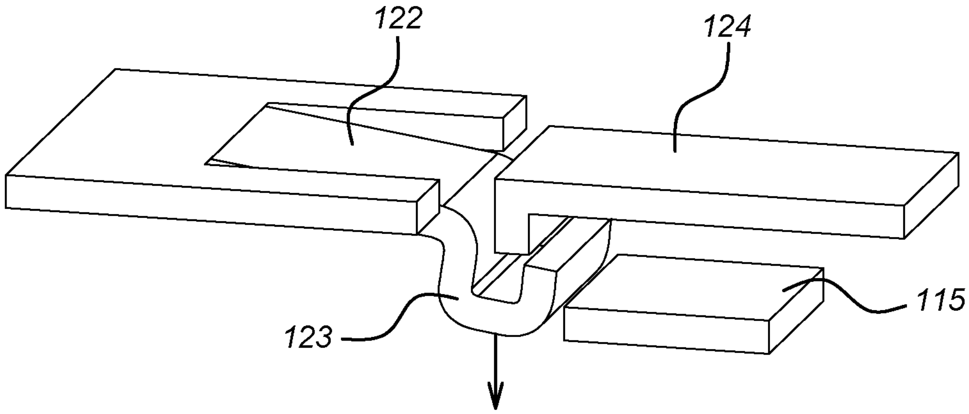

FIGS. 4A-C show an embodiment in which the mechanical lock assembly 20 comprises a resilient part of the dispenser housing 50, which forms both the operation part 122 and the latch 123, and the electronic lock assembly 10 comprises a longitudinally movable blocking member 115. FIG. 4A shows the latch 123 in the locked position, engaging a counterpart 124 on the dispenser housing 50, and the blocking member 115 in blocking position. FIG. 4B shows the blocking member 115 being moved from the blocking to the unblocking position by an electric actuator (not shown) of the electronic lock assembly 10. FIG. 4C shows the blocking member 115 in the unblocking position and the operation part 122/latch 123 being operated to move from the locked position to the unlocked position in which it is disengaged from the counterpart 124.

Figure 5A:
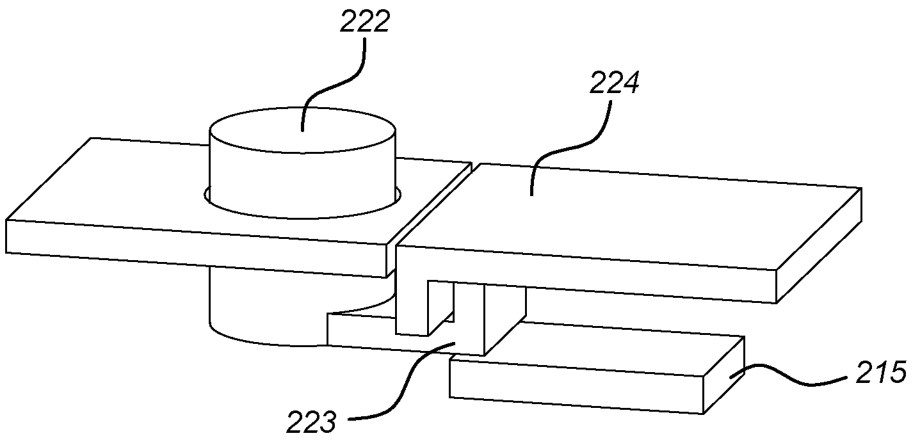
FIG. 5A-C shows a schematic view of another embodiment of a mechanical lock assembly for use in dispensers according to the present disclosure, as well as its operation.
Figure 5B:
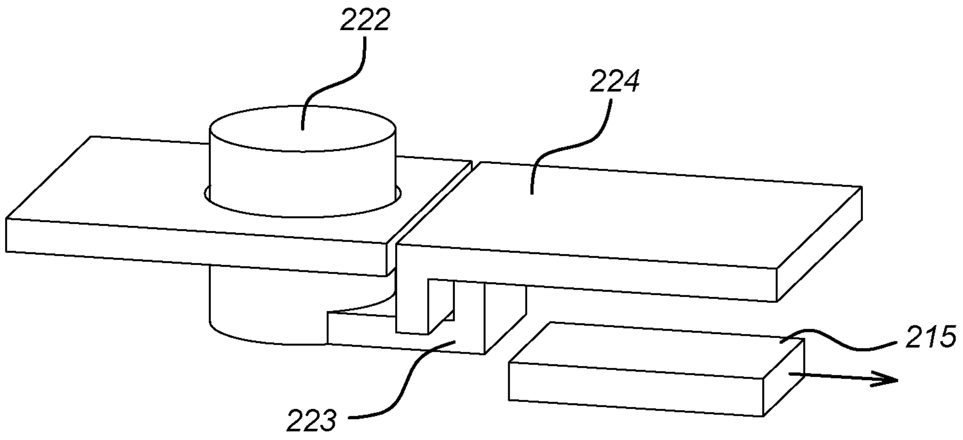
Figure 5C:
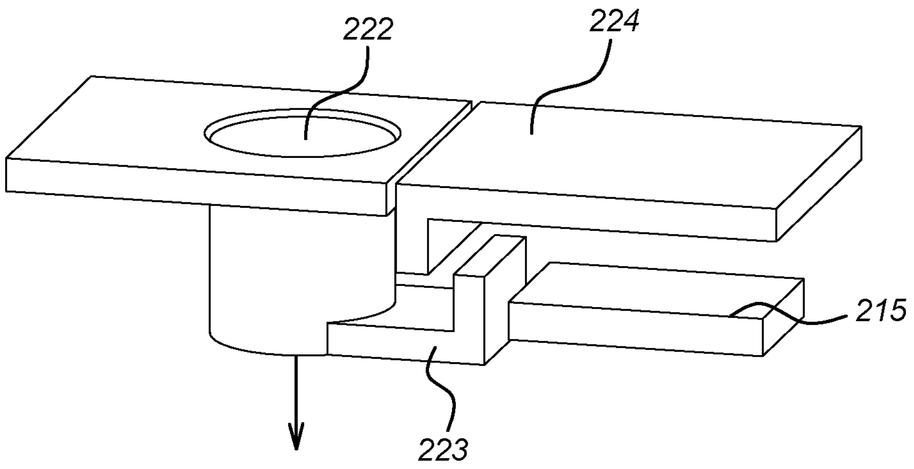

FIG. 5A-C shows an embodiment in which the mechanical lock assembly 20 comprises a vertically movable part which comprises a push button 222 and a latch 223 as an integral part thereof. The electronic lock assembly 10 comprises a longitudinally movable blocking member 215. FIG. 4A shows the latch 223 in the locked position, engaging a counterpart 224 on the dispenser housing 50, and the blocking member 215 in blocking position. FIG. 4B shows the blocking member 215 being moved from the blocking to the unblocking position by an electric actuator (not shown) of the electronic lock assembly 10. FIG. 4C shows the blocking member 215 in the unblocking position and the push button 222 and latch 223 being pushed downwards, so that the latch 223 is moved from the locked position to the unlocked position in which it is disengaged from the counterpart 224.

Figure 6:
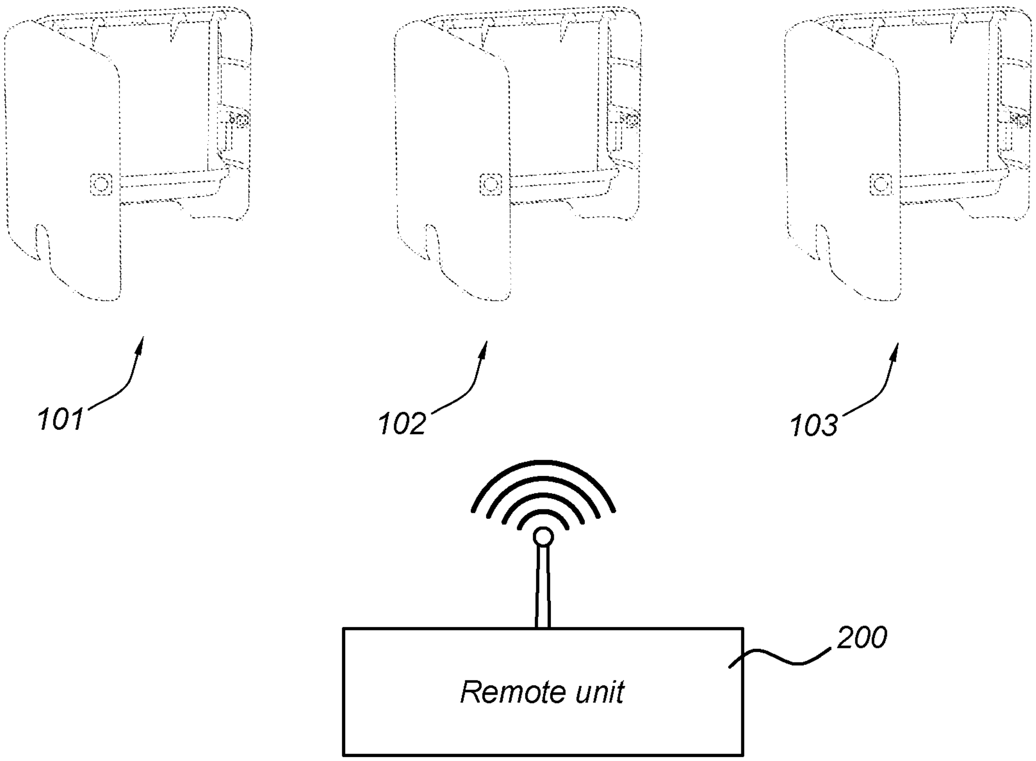
FIG. 6 shows a schematic view of an embodiment of a system according to the present disclosure, comprising a remote unit and a plurality of dispensers.

FIG. 6 shows a schematic view of an embodiment of a system comprising a remote unit 200 and a plurality of dispensers 101, 102, 103. The dispensers may be for the same dispensable product or for different dispensable products.

The remote unit 200 is configured for transmitting at least the unlock signal to the dispensers 101, 102, 103. The remote unit 200 may for example be an electronic key reader, configured for transmitting the unlock signal to the dispensers upon detecting an authorized electronic key, i.e. an electronic key which matches an authorization to access the dispensers. This obviates the need to provide a key reader or the like in every dispenser. In a certain room or area, one remote unit 200 may be provided which controls access to a number of dispensers within that particular room or area. The remote unit 200 may in and of itself be integrated in a dispenser.

In particular embodiments, the remote unit 200 may be further configured for transmitting a lock signal to the dispensers 101, 102, 103. The remote unit 200 may be configured for transmitting the lock signal upon detecting the authorized electronic key a second time, i.e. when the user applies his/her electronic key once more to the remote unit/key reader. In specific embodiments, the remote unit 200 may be configured for transmitting the unlock signal upon detecting the presence of the electronic key and for transmitting the lock signal upon detecting removal of the electronic key, which means that the electronic key needs to be present on the remote unit as long as access to the dispensers 101, 102, 103 is desired. In certain embodiments, the remote unit 200 may be configured for transmitting the lock signal to the dispensers 101, 102, 103 for a predetermined length of time, for example a time period between 5 and 10 minutes, after transmission of the unlock signal. Such a time period may be chosen depending on an estimated time needed for refilling the dispensers 101, 102, 103 with their respective dispensable product.

The remote unit 200 may be configured for communicating with a server system or central management system or the like and may receive instructions from such system to unlock and/or lock the dispensers 101, 102, 103.

It is contemplated that the embodiments described herein may be used in combination with and/or for use in a dispenser 1, and more particularly a dispenser comprising a dispenser housing 50 having an interior volume adapted for holding a dispensable product, such as, but not limited to, paper towel products, soaps, paper tissues, and the like. It is further contemplated that such dispensers may have an openable portion to provide access to the interior such that the dispensable product may be refilled and/or removed periodically, either in part or in its entirety.

It is to be understood that the invention is not limited to the embodiments described above but can be varied within scope as consistent with the spirit of the disclosure.

The invention claimed is:

1. A dispenser comprising:

a dispenser housing having an interior volume for holding a dispensable product, the dispenser housing having a fixed part and an openable part which is movable or removable with respect to the fixed part to provide access to the interior volume for refilling the dispensable product;

a mechanical lock assembly provided for locking the openable part to the fixed part of the dispenser housing, the mechanical lock assembly comprising a user accessible, movably mounted operation part for allowing a user to operate the mechanical lock assembly and a latch connected to the operation part such that upon operation of the operation part by the user the latch is moved from a locked position to an unlocked position; and an electronic lock assembly provided for blocking operation of the mechanical lock assembly, the electronic lock assembly comprising:

a blocking member movable between a blocking position in which it blocks the operation of the mechanical lock assembly and an unblocking position in which it allows the operation of the mechanical lock assembly, an electric actuator arranged for moving the blocking member between the blocking and unblocking positions, a receiver for receiving an unlock signal, and a control unit, configured for comparing the received unlock signal to at least one prestored value and upon determining that the unlock signal matches one of the at least one prestored values controlling the electric actuator to move the blocking member from the blocking position to the unblocking position, wherein the latch is movable in a first direction from the unlocked position to the locked position, and in a second direction opposite the first direction from the locked position to the unlocked position, wherein the latch comprises a first portion facing the first direction, the first portion configured to abut and latch onto a counterpart on the dispenser housing in the locked position, and a second portion facing the second direction, wherein, when the blocking member is in the blocking position, the blocking member abuts the second portion to prevent the latch from moving in the second direction to the unlocked position, and wherein, when the blocking member is in the unblocking position, the blocking member is in a position that does not abut the second portion such that the latch may be moved in the second direction to the unlocked position.

2. The dispenser according to claim 1, wherein the electronic lock assembly is mounted on the fixed part of the dispenser housing.

3. The dispenser according to claim 1, wherein the mechanical lock assembly comprises a resilient member biasing the latch towards the locked position.

4. The dispenser according to claim 3 wherein the latch is shaped for engaging, in the locked position, behind a counterpart on the dispenser housing and for being pushed away by the counterpart against the bias of the resilient member when the openable part of the dispenser housing is pushed closed.

5. The dispenser according to claim 1, wherein the user accessible operation part of the mechanical lock assembly comprises a push button.

6. The dispenser according to claim 5, wherein the latch is directly connected to the push button.

7. The dispenser according to claim 5, wherein the latch is connected to the push button via a motion transferring mechanism which is configured for converting an axial movement of the push button into a rotational movement of the latch.

8. The dispenser according to claim 1, wherein the receiver is adapted for receiving short-range wireless communication signals.

9. The dispenser according to claim 1, wherein the receiver is comprised in an electronic key reader.

10. The dispenser according to claim 1, wherein the control unit is configured for controlling the electric actuator to move the blocking member from the unblocking position to the blocking position a predetermined length of time after the blocking member has been moved from the blocking position to the unblocking position.

11. The dispenser according to claim 1, wherein the control unit is configured for controlling the electric actuator to move the blocking member from the unblocking position to the blocking position upon detecting receipt of a lock signal via the receiver.

12. A system, comprising:

at least one dispenser according to claim 1, and a remote unit configured for transmitting the unlock signal to said at least one dispenser.

13. The system of claim 12, wherein the remote unit comprises an electronic key reader and is configured for transmitting the unlock signal upon detecting an authorized electronic key.

14. The system of claim 12, wherein the remote unit is further configured for transmitting a lock signal to said at least one dispenser.

15. The system of claim 14, wherein the remote unit is configured for transmitting said lock signal upon detecting said authorized electronic key a second time or upon detecting removal of said authorized electronic key from the remote unit.

16. The system of claim 14, wherein the remote unit is configured for transmitting said lock signal a predetermined length of time after transmission of said unlock signal.

17. The dispenser according to claim 1, wherein the blocking member is arranged for blocking movement of the latch.

18. The dispenser according to claim 1, wherein the mechanical lock assembly is mounted on one of the fixed part and the openable part, and the electronic lock assembly is mounted on the other of the fixed part and the openable part.

19. A lock assembly suitable for use in a dispenser wherein said dispenser has an openable part and a fixed part, said lock assembly comprising:

a mechanical lock assembly provided for locking an openable part to a fixed part, the mechanical lock assembly comprising a user accessible, movably mounted operation part for allowing a user to operate the mechanical lock assembly and a latch connected to the operation part such that upon operation of the operation part by the user the latch is moved from a locked position to an unlocked position; and an electronic lock assembly provided for blocking operation of the mechanical lock assembly, the electronic lock assembly comprising:

a blocking member movable between a blocking position in which it blocks the operation of the mechanical lock assembly and an unblocking position in which it allows the operation of the mechanical lock assembly, an electric actuator arranged for moving the blocking member between the blocking and unblocking positions, a receiver for receiving an unlock signal, a control unit, configured for comparing the received unlock signal to at least one prestored value and upon determining that the unlock signal matches one of the at least one prestored values controlling the electric actuator to move the blocking member from the blocking position to the unblocking position, wherein the latch is movable in a first direction from the unlocked position to the locked position, and in a second direction opposite the first direction from the locked position to the unlocked position, wherein the latch comprises a first portion facing the first direction, the first portion configured to abut and latch onto a counterpart on the dispenser in the locked position, and a second portion facing the second direction, wherein, when the blocking member is in the blocking position, the blocking member abuts the second portion to prevent the latch from moving in the second direction to the unlocked position, and wherein, when the blocking member is in the unblocking position, the blocking member is in a position that does not abut the second portion such that the latch may be moved in the second direction to the unlocked position.

20. The lock assembly according to claim 19, wherein the electronic lock assembly is mounted on the fixed part.

21. The lock assembly according to claim 19, wherein the mechanical lock assembly comprises a resilient member biasing the latch towards the locked position.

22. The lock assembly according to claim 21, wherein the latch is shaped for engaging, in the locked position, behind the counterpart on the dispenser and for being pushed away by the counterpart against the bias of the resilient member when the openable part of the dispenser is pushed closed.

23. The lock assembly according to claim 19, wherein the user accessible operation part of the mechanical lock assembly comprises a push button.

24. The lock assembly according to claim 23, wherein the latch is directly connected to the push button.

25. The lock assembly according to claim 23, wherein the latch is connected to the push button via a motion transferring mechanism which is configured for converting an axial movement of the push button into a rotational movement of the latch.

26. The lock assembly according to claim 19, wherein the receiver is adapted for receiving short-range wireless communication signals.

27. The lock assembly according to claim 19, wherein the receiver is comprised in an electronic key reader.

28. The lock assembly according to claim 19, wherein the control unit is configured for controlling the electric actuator to move the blocking member from the unblocking position to the blocking position a predetermined length of time after the blocking member has been moved from the blocking position to the unblocking position.

29. The lock assembly according to claim 19, wherein the control unit is configured for controlling the electric actuator to move the blocking member from the unblocking position to the blocking position upon detecting receipt of a lock signal via the receiver.

30. The lock assembly according to claim 19, wherein the blocking member is arranged for blocking movement of the latch.

31. The lock assembly according to claim 19, wherein the mechanical lock assembly is mounted on one of the fixed part and the openable part, and the electronic lock assembly is mounted on the other of the fixed part and the openable part.

* * * * *